C. SEYMOUR.
PROPORTIONAL BALANCE.

No. 260,127.   Patented June 27, 1882.

WITNESSES:
Donn P. Twitchell
C. Sedgwick

INVENTOR:
C. Seymour
BY Munn & Co
ATTORNEYS.

UNITED STATES PATENT OFFICE.

CHARLES SEYMOUR, OF DEFIANCE, OHIO, ASSIGNOR TO DEFIANCE MACHINE WORKS, OF SAME PLACE.

PROPORTIONAL BALANCE.

SPECIFICATION forming part of Letters Patent No. 260,127, dated June 27, 1882.

Application filed February 28, 1880.

*To all whom it may concern:*

Be it known that I, CHARLES SEYMOUR, of Defiance, in the county of Defiance and State of Ohio, have invented a new Improvement in Proportional Scales, of which the following is a specification.

My improvements relate to scales for use in obtaining the proportional weight of the different parts of planer-knives, molding machine knives, tenoning-machine knives, &c.

In machines of the above-named character having knives fixed in a revolving head it is of the greatest importance that a running balance should be obtained, and the usual method, which consists in the reduction of the knives to the same cubic measurement or specific gravity, has not been found sufficient for the purpose.

The object of my invention is to obtain an indication of the differences in weight between corresponding parts of two or more knives, whereby an accurate distribution of weight in the cutter-head may be obtained.

My invention consists in a scale having a poised beam and counter-weights of usual construction, and having its platform fitted directly upon the scale-beam without an equipoise, so that a change of position of the article on the platform requires a shifting of the counter-weight to balance the scale.

Figure 1:
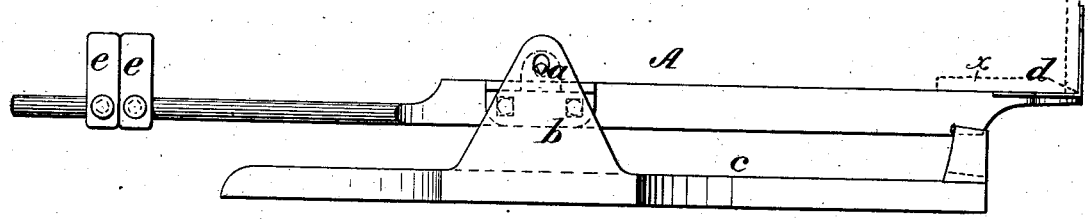
Figure 2:
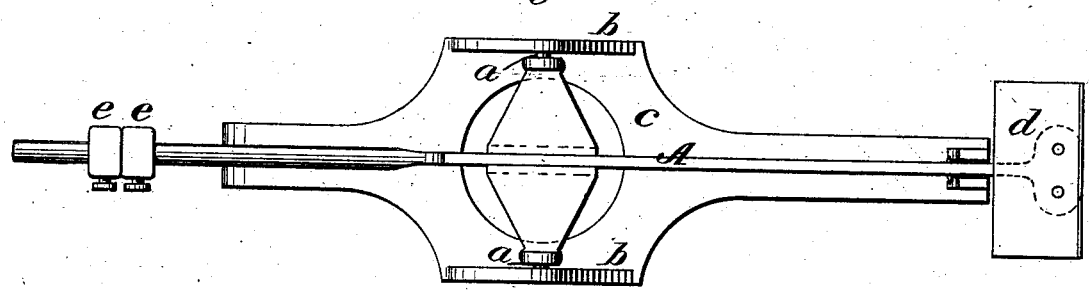
Figure 3:
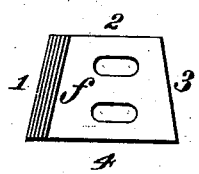

In the accompanying drawings, forming part of this specification, Figure 1 is a side elevation of my scale. Fig. 2 is a plan view. Fig. 3 represents a cutter such as is to be weighed.

Similar letters of reference indicate corresponding parts.

In the drawings, A is the scale-beam, hung by the knife-edge pivots $a$ in the standards $b$ of a suitable base, $c$, and fitted with the platform $d$ at one end and sliding counter-weights $e\ e$ upon the opposite end.

The cutter $f$ may represent one of a number of the same measurement in every respect and of the same weight and specific gravity, while the proportionate weight of its parts 1, 2, 3, and 4 may vary. If this cutter $f$ be placed on the platform $d$ with either portion 1, 2, 3, or 4 extending toward the scale-pivots, it can be balanced by moving the counter-weights on the beam, and in either position of the cutter the counter-weights will need to be shifted to obtain a balance. By these means two or more cutters can be compared in their weight in either position and the edge or side containing an excess of weight discovered, and the cutter-head can be accurately balanced by a proper distribution of weight in placing the cutters therein.

I prefer to use two counter-weights, so as to obtain more accurate results, and the said weights are fitted with set-screws for clamping them in position on the beam.

The operation of the device above described is as follows: Let it be supposed that two or more knives such as shown in Fig. 3 are intended to be fastened to one cutter-head designed to rotate at a high velocity, and that it is conceded they must not only be of the same specific weight, but must agree in their corresponding parts in order to allow the cutter-head to rotate true without shaking. Each knife is placed in succession on the scale-platform $d$, with its face against the vertical wall of said platform, and is balanced by the weights $e\ e$ at the opposite end of the scale-beam. If by this test they all appear to be of the same specific weight, then place them each in succession with their backs against the vertical wall, in which position they may still appear to be of the same specific weight. Then place them each in succession flatwise upon the platform, as shown by dotted lines $x$ in Fig. 1, in as many different positions as they are susceptible of being placed in, noting and reducing by an indefinite number of trials the edges which are found to be of excessive weight until they are all reduced to the same weight in their corresponding parts, when they will consequently all be of the same specific total weight.

The balancing-weights $e$ are made oblong, with the holes for the beam near one end, so that they may be fastened heavy end up in order to have the entire mass of weight-beam and knife poised near the center of gravity, and thereby oscillate more sensitively. If, however, the objects to be balanced are very heavy, the weights must be turned down, or the upper portion of the mass will preponderate.

It is evident that the device may be used for weighing any detachable parts of revolving machinery, and therefore I do not wish to confine myself to merely weighing knives or cutters.

Having thus described my invention, what I claim as new, and desire to secure by Letters Patent, is—

1. The combination, with the scale-beam A and the frame b c, in which it is pivotally hung by a knife-edge, a, of the right-angle platform d, having a vertical wall above the beam, at one end of the beam, and the weights e at the opposite end of the same, substantially as and for the purpose specified.

2. The combination, with the scale-beam A, the supporting-frame b c, and the right-angle platform d, of the oblong weights e e, having holes near one end and adapted to be changed in their positions on the beam, whereby they may be secured above or below the beam, according to the weight of the articles being weighed, substantially as and for the purpose specified.

CHARLES SEYMOUR.

Witnesses:
JACOB J. GREENE,
P. KETTENRING.